US012792161B2

(12) United States Patent
Tang et al.

(10) Patent No.: US 12,792,161 B2
(45) Date of Patent: Nov. 10, 2026

(54) TOUCH CHIP, TOUCH SYSTEM, AND ERASE METHOD OF STYLUS

(71) Applicant: NOVATEK Microelectronics Corp., Hsinchu (TW)

(72) Inventors: Yu-Ying Tang, Taoyuan City (TW); Weijen Chang, Tainan City (TW); Chih-Chang Lai, Taichung City (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 19/250,081

(22) Filed: Jun. 26, 2025

(65) Prior Publication Data

US 2026/0003449 A1 Jan. 1, 2026

Related U.S. Application Data

(60) Provisional application No. 63/782,031, filed on Apr. 2, 2025, provisional application No. 63/664,738, filed on Jun. 27, 2024.

(30) Foreign Application Priority Data

Jun. 6, 2025 (TW) ................................ 114121361

(51) Int. Cl.
*G06F 3/038* (2013.01)
*G06F 3/0354* (2013.01)

(52) U.S. Cl.
CPC .......... *G06F 3/038* (2013.01); *G06F 3/03545* (2013.01)

(58) Field of Classification Search
CPC combination set(s) only.
See application file for complete search history.

(56) References Cited

U.S. PATENT DOCUMENTS 9,733,732 B2 * 8/2017 Zaitsev ............... G06F 3/03545
2009/0295757 A1 * 12/2009 He ...................... G06F 3/03545 345/177
2016/0170504 A1 * 6/2016 Varlamov ........... G06F 3/03545 345/179
2016/0282965 A1 * 9/2016 Jensen ................ G06F 3/04162
2017/0277284 A1 * 9/2017 Kim .................... G06F 3/03545
2018/0052534 A1 * 2/2018 Ron ........................ G06T 11/60

FOREIGN PATENT DOCUMENTS

TW 201818202 A 5/2018

* cited by examiner

*Primary Examiner* — William Boddie
*Assistant Examiner* — Alecia D English
(74) *Attorney, Agent, or Firm* — CKC & Partners Co., LLC

(57) ABSTRACT

A touch chip is to receive a first signal and a second signal from a stylus and includes a receiver circuit and a processor circuit. The receiver circuit is to receive the first signal and the second signal. The processor circuit is coupled to the receiver circuit and is to perform operations below: determining whether a signal intensity of the received first signal is greater than a first threshold value; determining whether a second signal is received when the signal intensity of the received first signal is greater than the first threshold value; determining whether a signal intensity ratio of the second signal to the first signal is greater than a second threshold value to generate a determination result when it is determined that the second signal is received; and performing an erase function according to the determination result.

18 Claims, 15 Drawing Sheets

800

TOUCH CHIP, TOUCH SYSTEM, AND ERASE METHOD OF STYLUS

RELATED APPLICATIONS

This application claims priority to U.S. Provisional Application Ser. No. 63/664,738, filed Jun. 27, 2024, U.S. Provisional Application Ser. No. 63/782,031, filed Apr. 2, 2025, and Taiwanese Application Serial Number 114121361, filed Jun. 6, 2025, which are herein incorporated by reference.

BACKGROUND

Technical Field

The present disclosure relates to touch technology. More particularly, the present disclosure relates to a touch chip, a touch system, and an erase method that can be applied to a stylus with an erase function.

Description of Related Art

With developments of technology, touch panels have been applied to various electronic devices. Nowadays, more and more touch panels can be used with styluses. A user can operate a stylus to write, erase, or perform other functions on the touch panel.

SUMMARY

Some aspects of the present disclosure are to a touch chip. The touch chip is to receive a first signal and a second signal from a stylus and includes a receiver circuit and a processor circuit. The receiver circuit is to receive the first signal and the second signal. The processor circuit is coupled to the receiver circuit and is to perform operations below: determining whether a signal intensity of the received first signal is greater than a first threshold value; determining whether the second signal is received when the signal intensity of the received first signal is greater than the first threshold value; determining whether a signal intensity ratio of the second signal to the first signal is greater than a second threshold value to generate a determination result when it is determined that the second signal is received; and performing an erase function according to the determination result.

Some aspects of the present disclosure are to a touch system. The touch system includes a stylus and a touch panel. The touch panel includes a touch chip. The touch chip is to receive a first signal and a second signal from the stylus and includes a receiver circuit and a processor circuit. The receiver circuit is to receive the first signal and the second signal. The processor circuit is coupled to the receiver circuit and to perform operations below: determining whether a signal intensity of the received first signal is greater than a first threshold value; determining whether the second signal is received when the signal intensity of the received first signal is greater than the first threshold value; determining whether a signal intensity ratio of the second signal to the first signal is greater than a second threshold value to generate a determination result when it is determined that the second signal is received; and performing an erase function according to the determination result.

Some aspects of the present disclosure are to an erase method of a stylus. The erase method of the stylus includes operations below: receiving, by a receiver circuit in a touch chip, a first signal and a second signal from the stylus; determining, by a processor circuit, whether a signal intensity of the received first signal is greater than a first threshold value; determining, by the processor circuit, whether the second signal is received when the signal intensity of the received first signal is greater than the first threshold value; determining, by the processor circuit, whether a signal intensity ratio of the second signal to the first signal is greater than a second threshold value to generate a determination result when it is determined that the second signal is received; and performing, by the processor circuit, an erase function according to the determination result.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
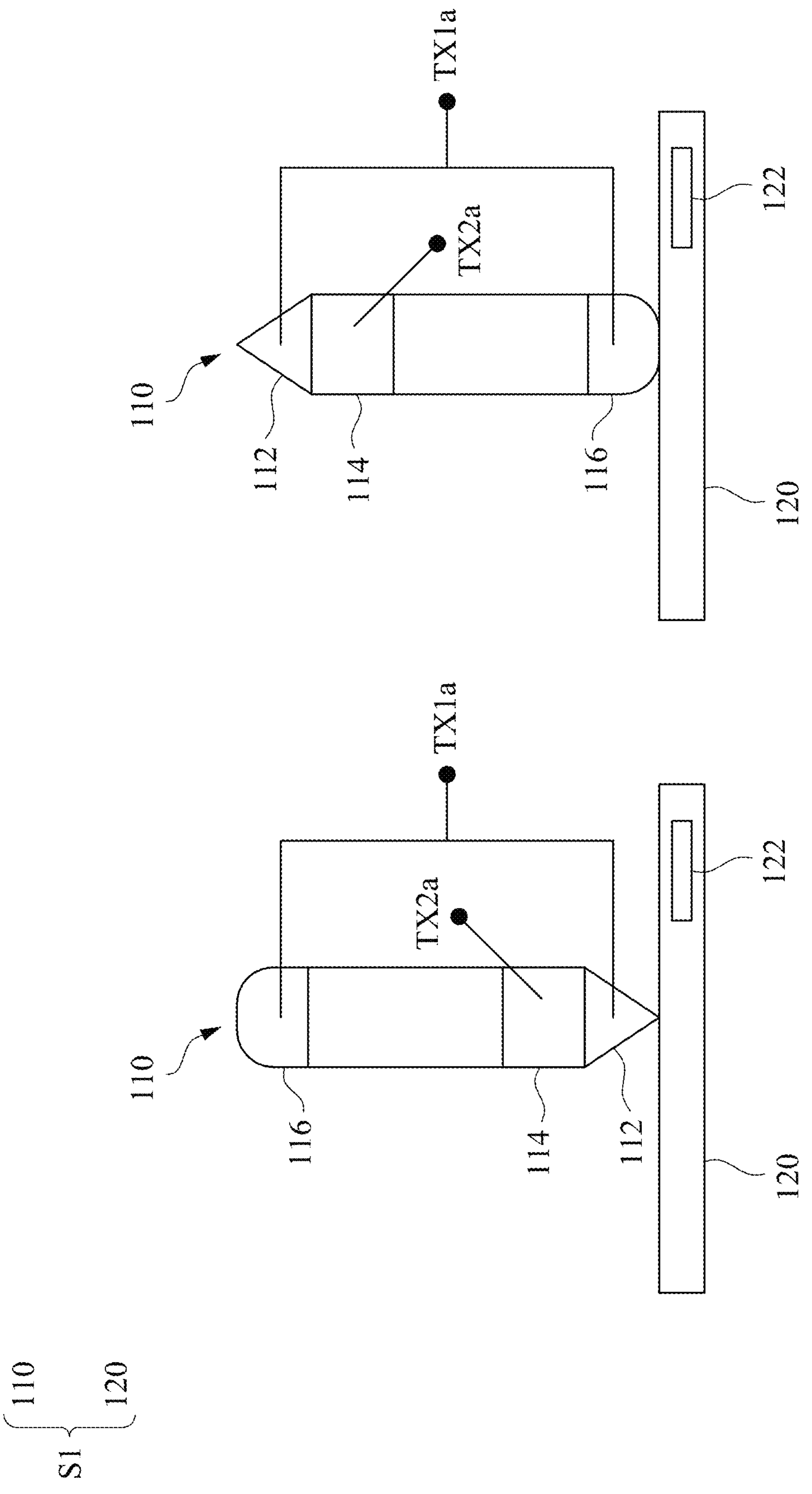
FIG. 1 is a schematic diagram illustrating a touch system according to some embodiments of the present disclosure.

Reference is made to FIG. 1. FIG. 1 is a schematic diagram illustrating a touch system S1 according to some embodiments of the present disclosure. The touch system S1 includes a stylus 110 and a touch panel 120. A user can operate the stylus 110 to write, erase, or perform other functions on the touch panel 120.

The stylus 110 includes a tip electrode 112, a ring electrode 114, and the end electrode 116. The tip electrode 112 is disposed at a tip portion of a pen body of the stylus 110.

The ring electrode 114 is disposed at a ring portion of the pen body of the stylus 110, and the ring portion is near fingers of the user when the user holds the stylus 110. The end electrode 116 is disposed at an end portion of the pen body of the stylus 110.

The tip electrode 112 and the end electrode 116 are to emit a signal TX1*a*. The ring electrode 114 is to emit a signal TX2*a*. The signal TX1*a* and the signal TX2*a* are different from each other.

The touch panel 120 includes a touch chip 122. The touch chip 122 is to receive (sense) the signal TX1*a* and the signal TX2*a* from the stylus 110.

Figure 2:
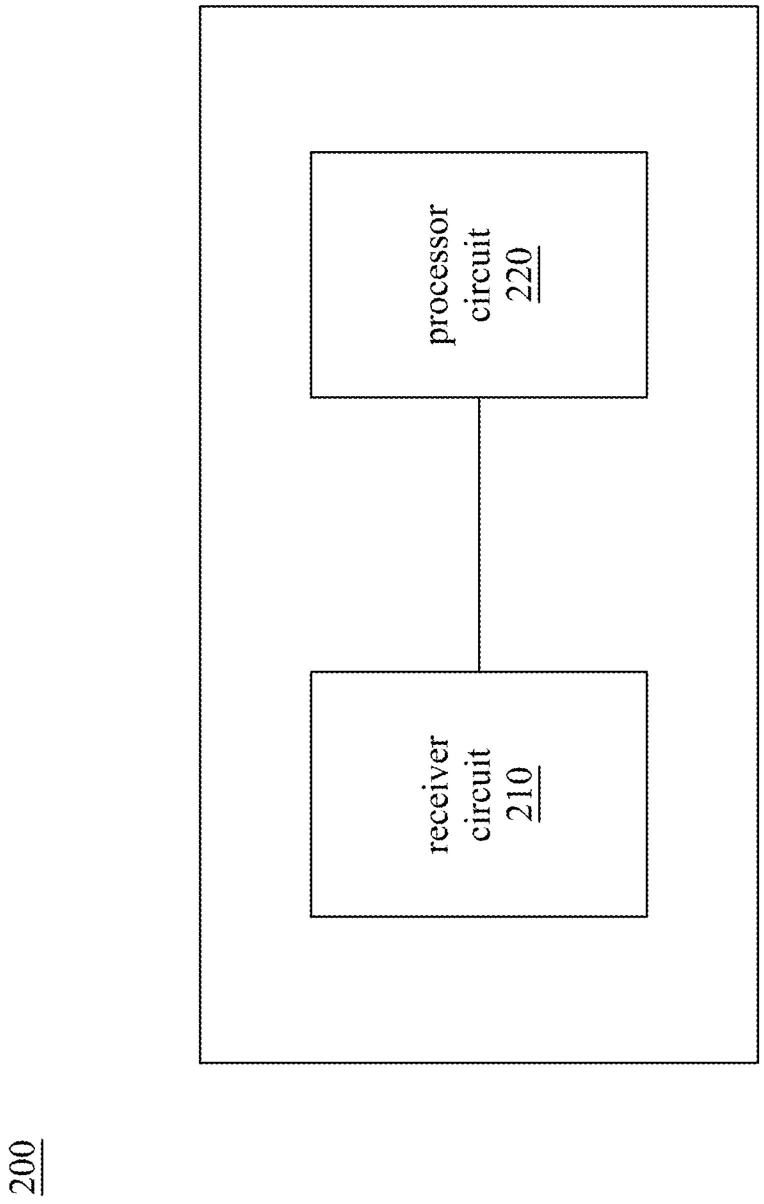
FIG. 2 is a schematic diagram illustrating a touch chip according to some embodiments of the present disclosure.

Reference is made to FIG. 2. FIG. 2 is a schematic diagram illustrating a touch chip 200 according to some embodiments of the present disclosure. In some embodiments, the touch chip 200 can be used to implement the touch chip 122 in FIG. 1.

The touch chip 200 includes a receiver circuit 210 and a processor circuit 220. The receiver circuit 210 is coupled to the processor circuit 220.

The receiver circuit 210 is to receive (sense) the signal TX1*a* and the signal TX2*a* from the stylus 110.

Figure 3:
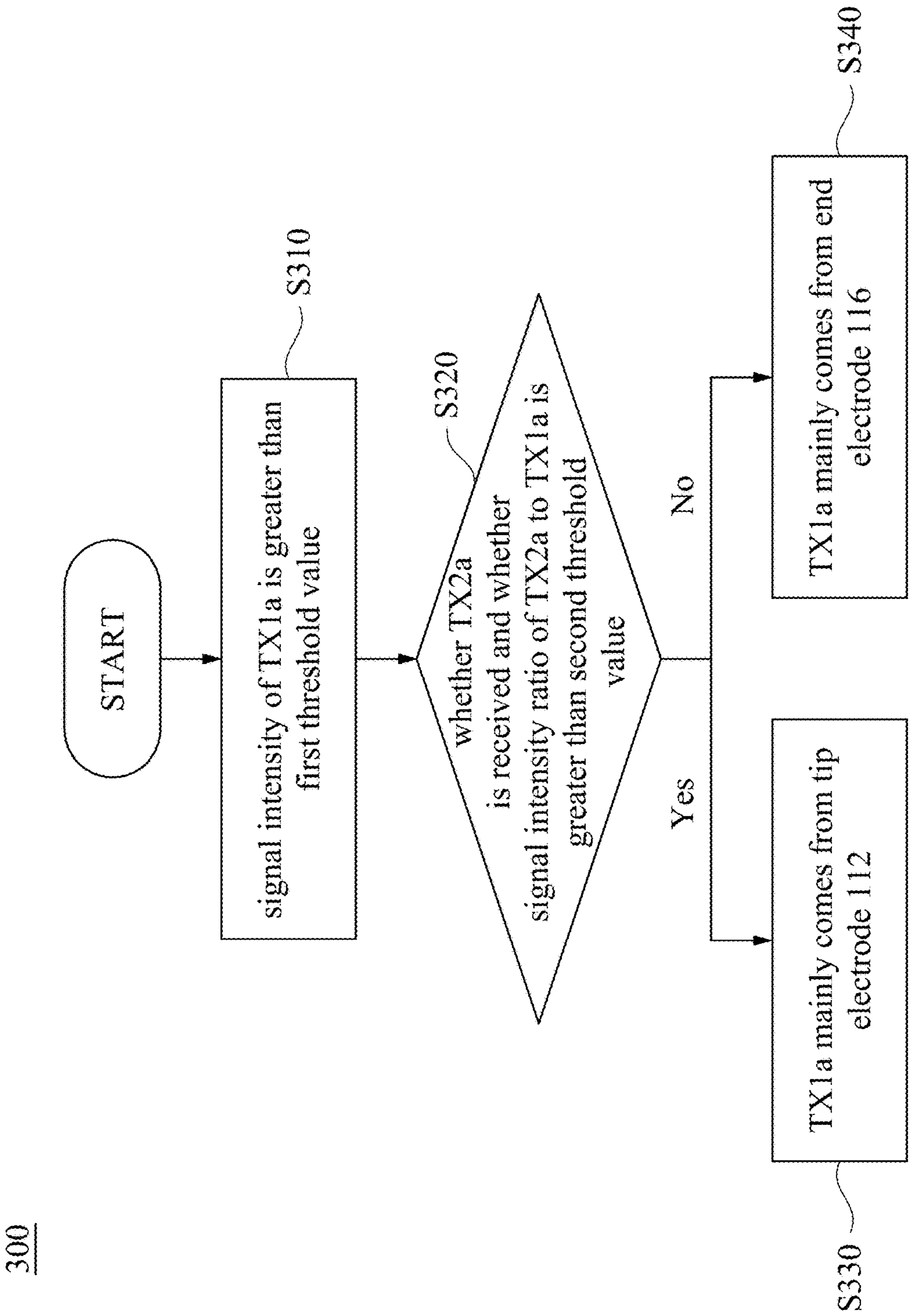
FIG. 3 is a flow diagram illustrating an erase method of a stylus according to some embodiments of the present disclosure.

Reference is made to FIG. 3. FIG. 3 is a flow diagram illustrating an erase method 300 of the stylus 110 according to some embodiments of the present disclosure.

The erase method 300 includes operation S310, operation S320, operation S330, and operation S340. The processor circuit 220 is to perform these operations.

At first, the processor circuit 220 determines whether a signal intensity of the received signal TX1*a* is greater than a first threshold value.

In operation S310, when the processor circuit 220 determines that the signal intensity of the received signal TX1*a* is greater than the first threshold value, it enters operation S320.

In operation S320, the processor circuit 220 determines whether the signal TX2*a* is received. When it is determined that the signal TX2*a* is received, the processor circuit 220 determines whether a signal intensity ratio of the signal TX2*a* to the signal TX1*a* is greater than a second threshold value to generate a determination result.

When the signal intensity ratio of the signal TX2*a* to the signal TX1*a* is greater than the second threshold value, it represents that the ring electrode 114 (the tip electrode 112) is closer to the touch panel 120, as shown on the left side of FIG. 1. Accordingly, the determination result of operation S320 is "Yes" and it enters operation S330.

In operation S330, the processor circuit 220 determines that the signal TX1*a* mainly comes from the tip electrode 112. The processor circuit 220 can operate according to the signal TX1*a* from the tip electrode 112. For example, the processor circuit 220 performs a write function according to the signal TX1*a* from the tip electrode 112.

When the signal intensity ratio of the signal TX2*a* to the signal TX1*a* is less than or equal to the second threshold value, it represents that the ring electrode 114 (the tip electrode 112) is farther away from the touch panel 120, as shown on the right side of FIG. 1. Accordingly, the determination result of operation S320 is "No" and it enters operation S340.

In operation S340, the processor circuit 220 determines that the signal TX1*a* mainly comes from the end electrode 116. The processor circuit 220 can operate according to the signal TX1*a* from the end electrode 116. For example, the processor circuit 220 performs an erase function according to the signal TX1*a* from the end electrode 116.

Figure 4:
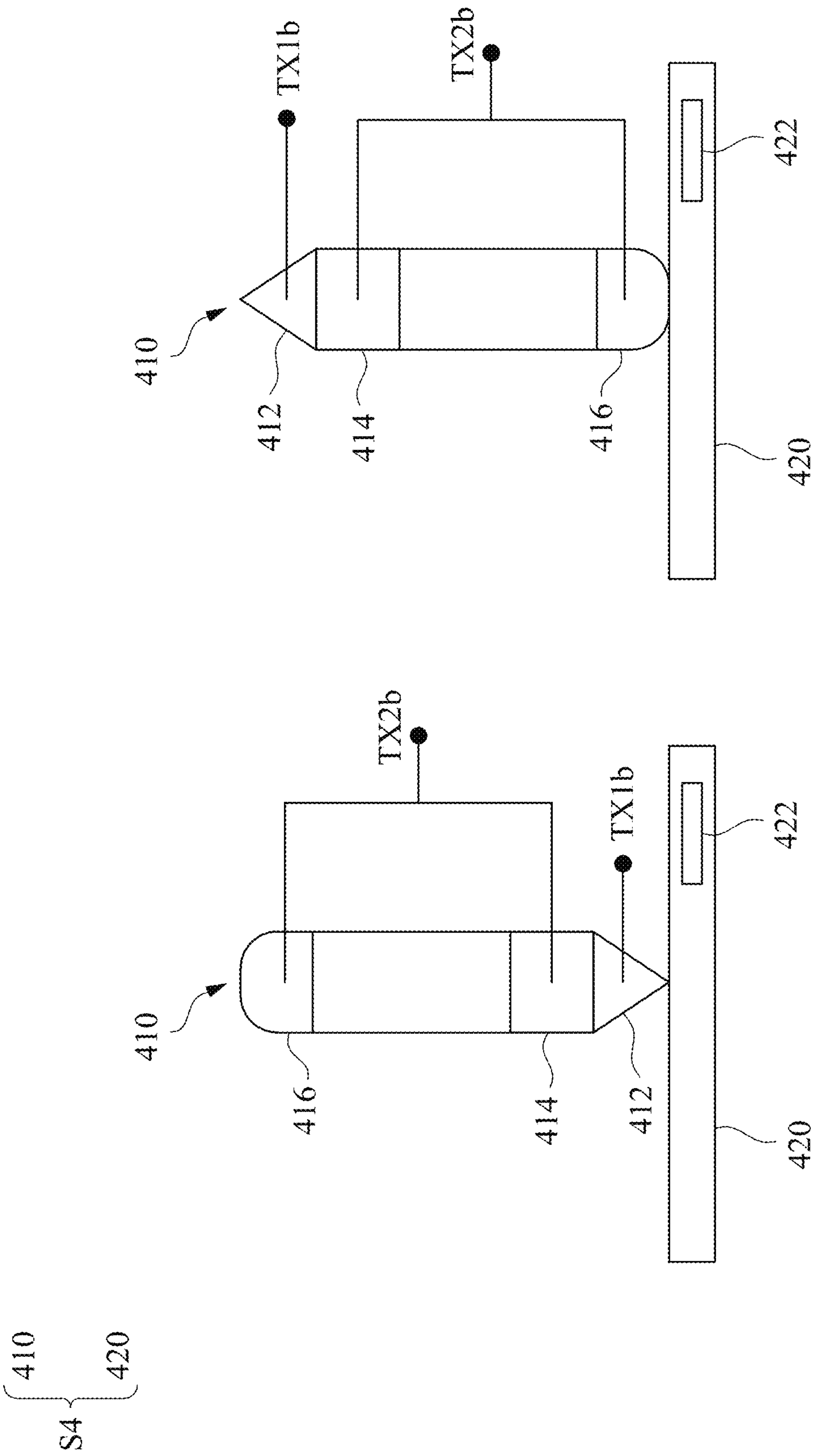
FIG. 4 is a schematic diagram illustrating a touch system according to some embodiments of the present disclosure.

Reference is made to FIG. 4. FIG. 4 is a schematic diagram illustrating a touch system S4 according to some embodiments of the present disclosure. The touch system S4 includes a stylus 410 and a touch panel 420. A user can operate the stylus 410 to write, erase, or perform other functions on the touch panel 420.

The stylus 410 includes a tip electrode 412, a ring electrode 414, and an end electrode 416. The tip electrode 412 is disposed at a tip portion of a pen body of the stylus 410. The ring electrode 414 is disposed at a ring portion of the pen body of the stylus 410, and the ring portion is near fingers of the user when the user holds the stylus 410. The end electrode 416 is disposed at an end portion of the pen body of the stylus 410.

The ring electrode 414 and the end electrode 416 are to emit a signal TX2*b*. The tip electrode 412 is to emit a signal TX1*b*. The signal TX2*b* and the signal TX1*b* are different from each other.

The touch panel 420 includes a touch chip 422. The touch chip 422 is to receive (sense) the signal TX2*b* and the signal TX1*b* from the stylus 410.

Figure 5:
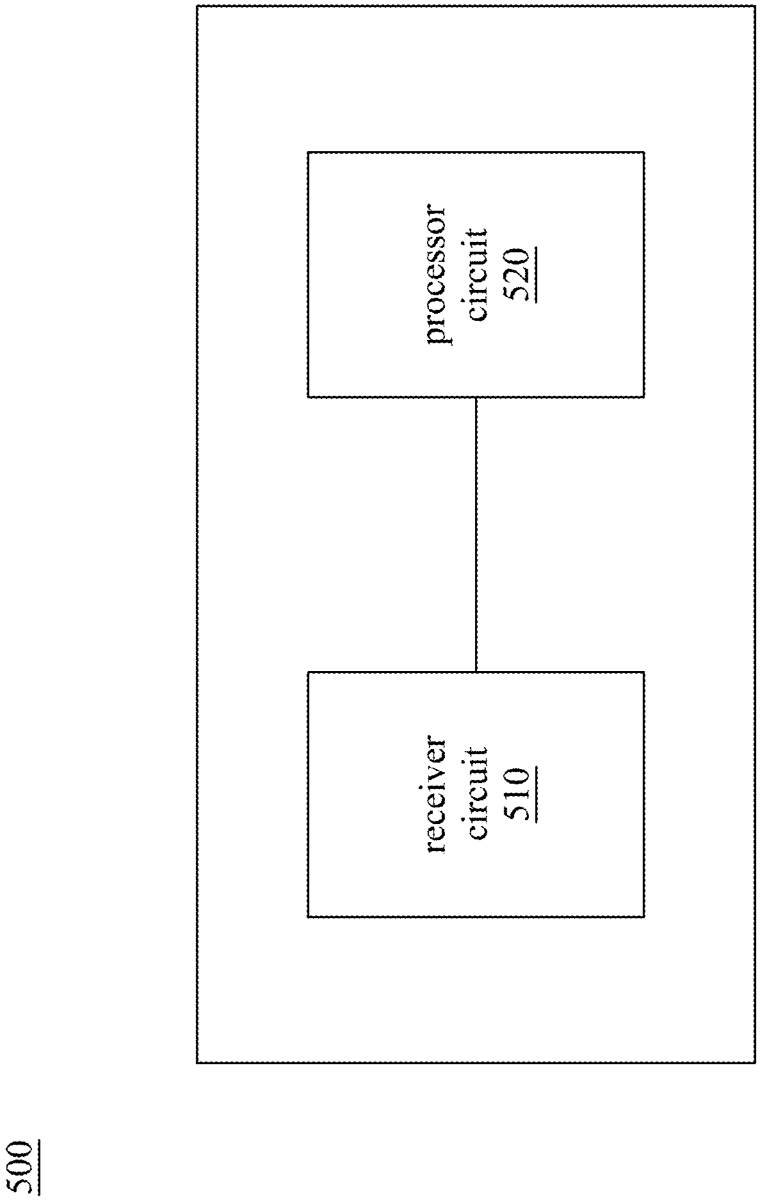
FIG. 5 is a schematic diagram illustrating a touch chip according to some embodiments of the present disclosure.

Reference is made to FIG. 5. FIG. 5 is a schematic diagram illustrating a touch chip 500 according to some embodiments of the present disclosure. In some embodiments, the touch chip 500 can be used to implement the touch chip 422 in FIG. 4.

The touch chip 500 includes a receiver circuit 510 and a processor circuit 520. The receiver circuit 510 is coupled to the processor circuit 520.

The receiver circuit 510 is to receive (sense) the signal TX2*b* and the signal TX1*b* from the stylus 410.

Figure 6:
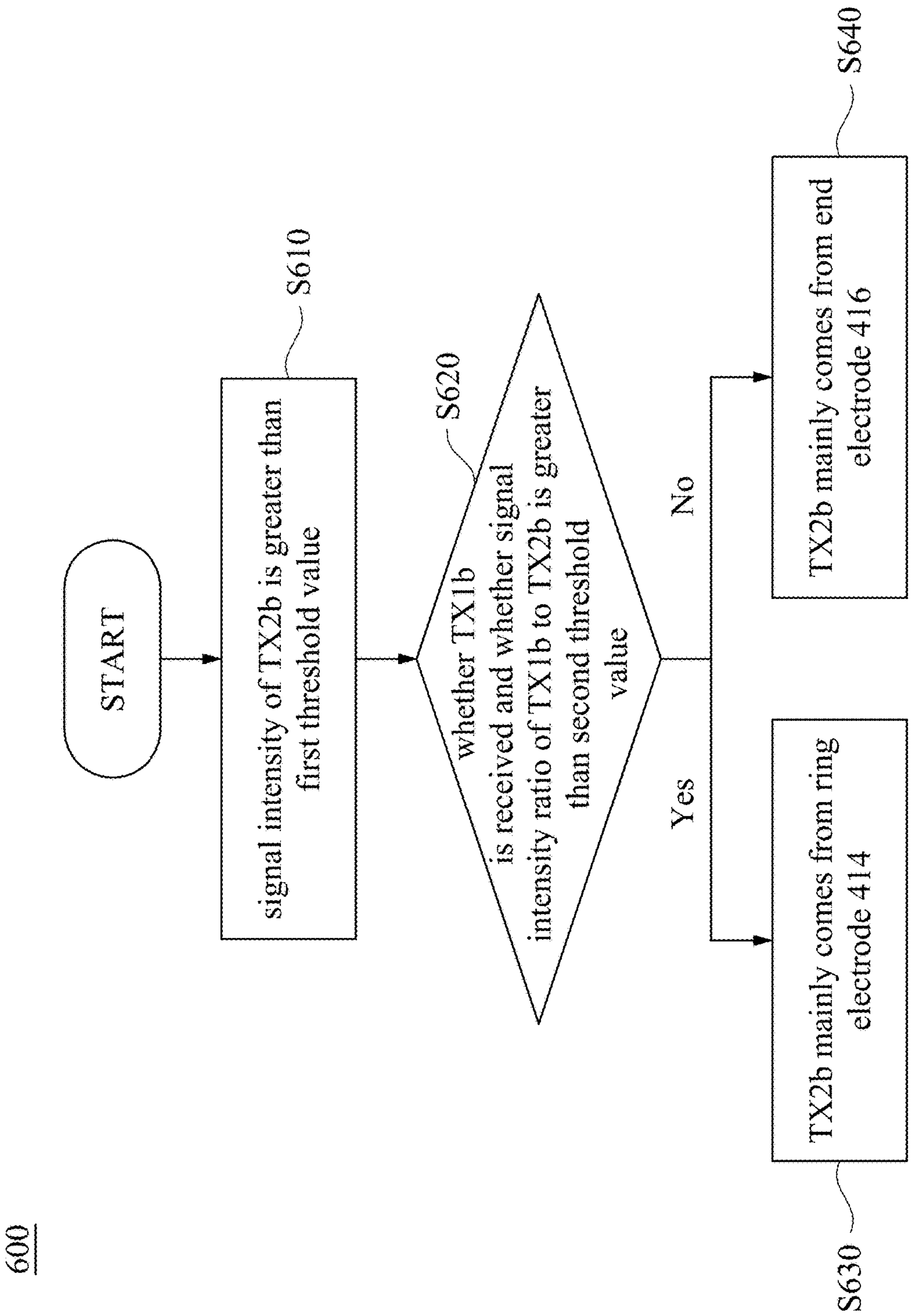
FIG. 6 is a flow diagram illustrating an erase method of a stylus according to some embodiments of the present disclosure.

Reference is made to FIG. 6. FIG. 6 is a flow diagram illustrating an erase method 600 of the stylus 410 according to some embodiments of the present disclosure.

The erase method 600 includes operation S610, operation S620, operation S630, and operation S640. The processor circuit 520 is to perform these operations.

At first, the processor circuit 520 determines whether a signal intensity of the received signal TX2*b* is greater than a first threshold value.

In operation S610, when the processor circuit 520 determines that the signal intensity of the received signal TX2*b* is greater than the first threshold value, it enters operation S620.

In operation S620, the processor circuit 520 determines whether the signal TX1*b* is received. When it is determined that the signal TX1*b* is received, the processor circuit 520 determines whether a signal intensity ratio of the signal TX1*b* to the signal TX2*b* is greater than a second threshold value to generate a determination result.

When the signal intensity ratio of the signal TX1*b* to the signal TX2*b* is greater than the second threshold value, it represents that the ring electrode 414 (the tip electrode 412) is closer to the touch panel 420, as shown on the left side of FIG. 4. Accordingly, the determination result of operation S620 is "Yes" and it enters operation S630.

In operation S630, the processor circuit 520 determines that the signal TX2*b* mainly comes from the ring electrode 414. The processor circuit 520 can operate according to the signal TX2*b* from the ring electrode 414. For example, the processor circuit 520 determines a tilt angle of the stylus 410 according to the signal TX2*b* from the ring electrode 414 and the signal TX1*b* from the tip electrode 412.

When the signal intensity ratio of the signal TX1*b* to the signal TX2*b* is less than or equal to the second threshold value, it represents that the ring electrode 414 (the tip electrode 412) is farther away from the touch panel 420, as shown on the right side of FIG. 4. Accordingly, the determination result of operation S620 is "No" and it enters operation S640.

In operation S640, the processor circuit 520 determines that the signal TX2*b* mainly comes from the end electrode 416. The processor circuit 520 can operate according to the signal TX2*b* from the end electrode 416. For example, the processor circuit 520 performs an erase function according to the signal TX2*b* from the end electrode 416.

Figure 7:
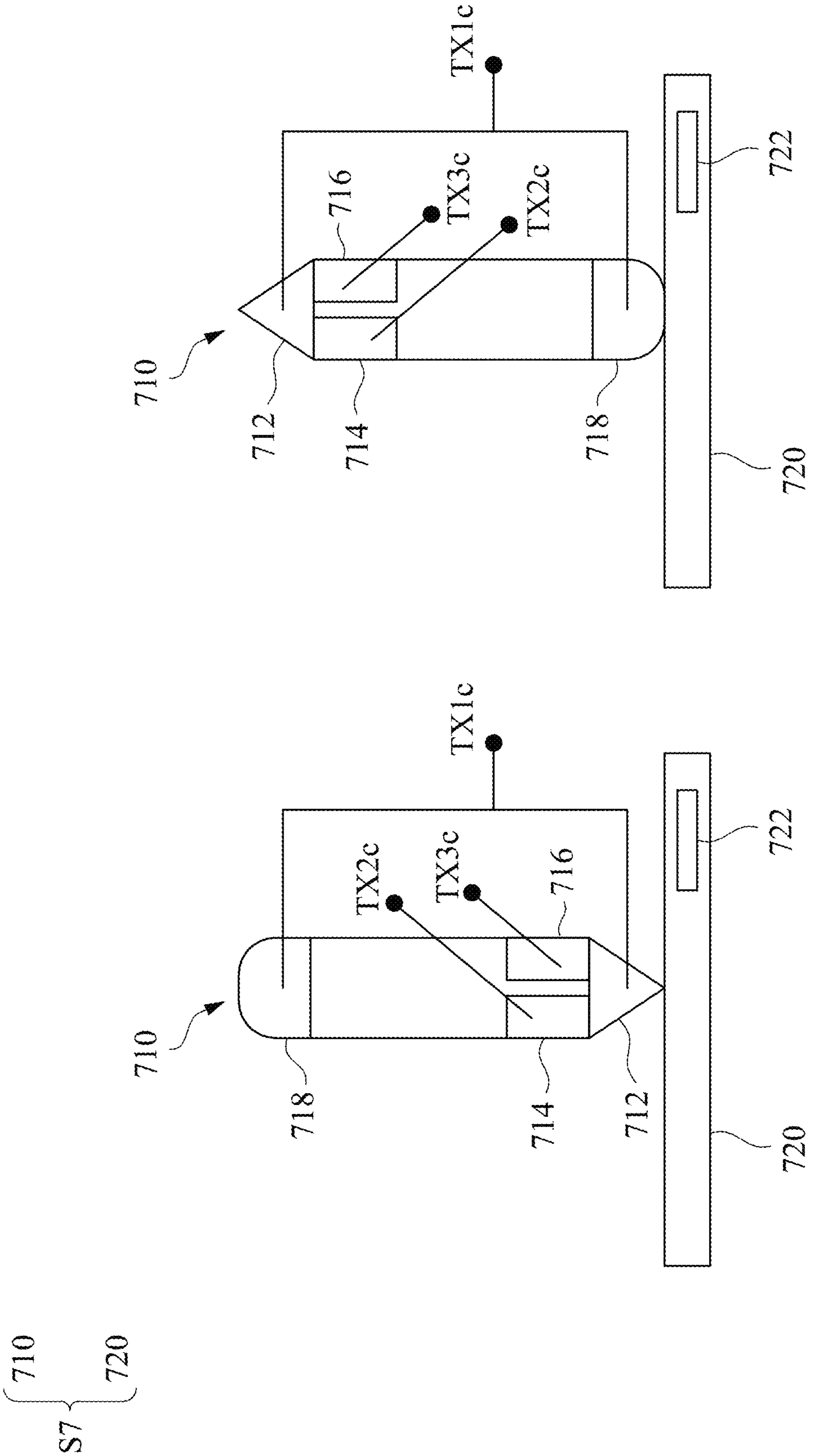
FIG. 7 is a schematic diagram illustrating a touch system according to some embodiments of the present disclosure.

Reference is made to FIG. 7. FIG. 7 is a schematic diagram illustrating a touch system S7 according to some embodiments of the present disclosure. The touch system S7 includes a stylus 710 and a touch panel 720. A user can operate the stylus 710 to write, erase, or perform other functions on the touch panel 720.

The stylus 710 includes a tip electrode 712, a ring part electrode 714, a ring part electrode 716, and an end electrode 718. The tip electrode 712 is disposed at a tip portion of a pen body of the stylus 710. The ring part electrode 714 and the ring part electrode 716 are disposed at a ring portion of the pen body of the stylus 710, and the ring portion is near fingers of the user when the user holds the stylus 710. The end electrode 718 is disposed at an end portion of the pen body of the stylus 710.

The tip electrode 712 and the end electrode 718 are to emit a signal TX1*c*. The ring part electrode 714 is to emit a signal TX2*c*. The ring part electrode 716 is to emit a signal TX3*c*. The signal TX1*c*, the signal TX2*c*, and the signal TX3*c* are different from each other.

The touch panel 720 includes a touch chip 722. The touch chip 722 is to receive (sense) the signal TX1*c*, the signal TX2*c*, and the signal TX3*c* from the stylus 710.

Figure 8:
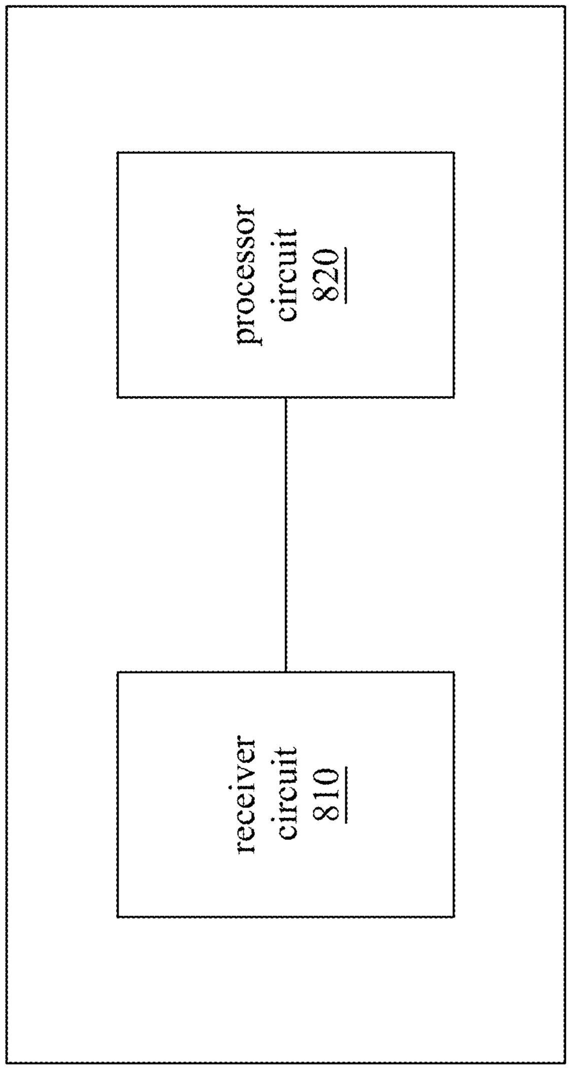
FIG. 8 is a schematic diagram illustrating a touch chip according to some embodiments of the present disclosure.

Reference is made to FIG. 8. FIG. 8 is a schematic diagram illustrating a touch chip 800 according to some embodiments of the present disclosure. In some embodiments, the touch chip 800 can be used to implement the touch chip 722 in FIG. 7.

The touch chip 800 includes a receiver circuit 810 and a processor circuit 820. The receiver circuit 810 is coupled to the processor circuit 820.

The receiver circuit 810 is to receive (sense) the signal TX1*c*, the signal TX2*c*, and the signal TX3*c* from the stylus 710.

Figure 9:
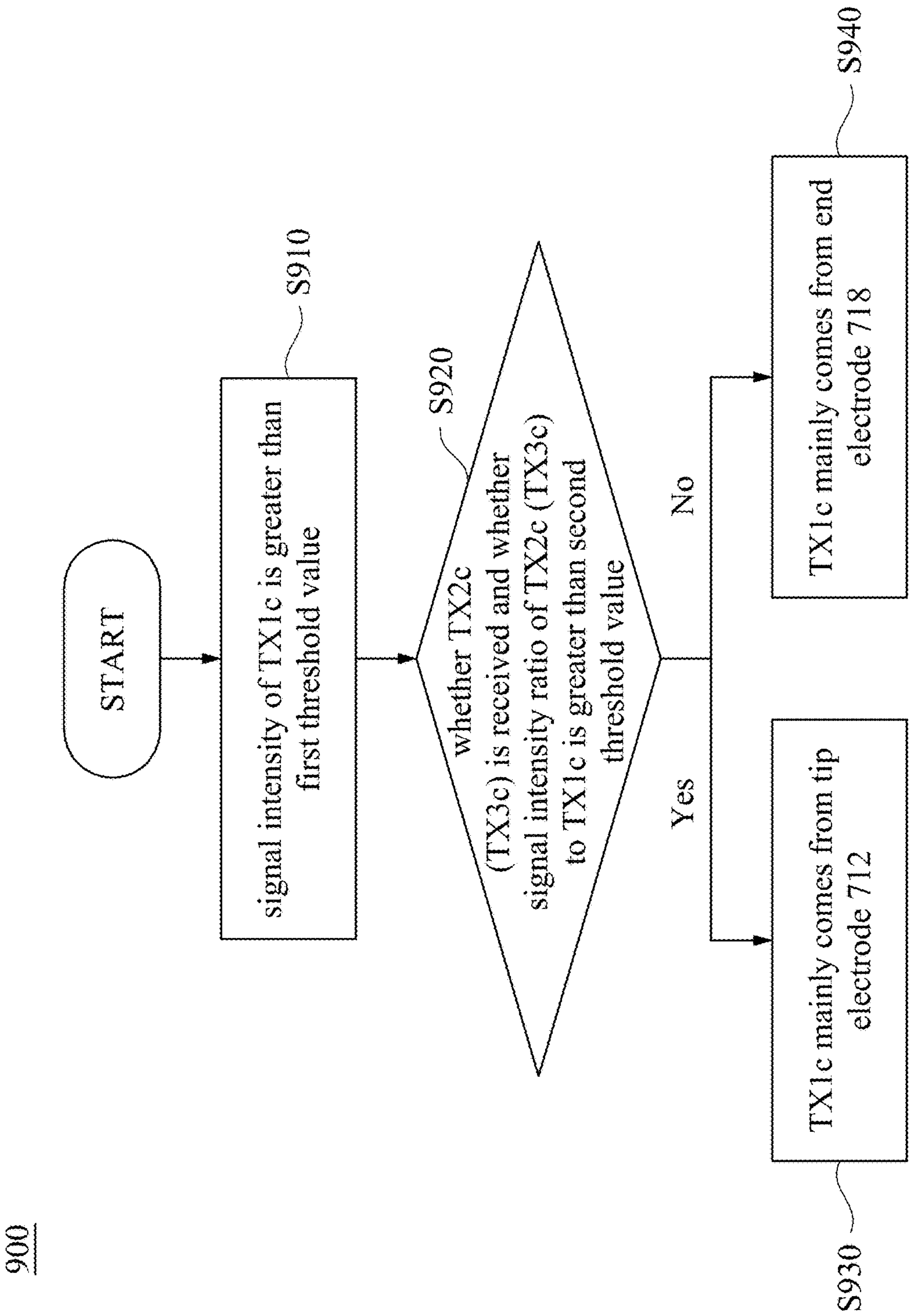
FIG. 9 is a flow diagram illustrating an erase method of a stylus according to some embodiments of the present disclosure.

Reference is made to FIG. 9. FIG. 9 is a flow diagram illustrating an erase method 900 of the stylus 710 according to some embodiments of the present disclosure.

The erase method 900 includes operation S910, operation S920, operation S930, and operation S940. The processor circuit 820 is to perform these operations.

At first, the processor circuit 820 determines whether a signal intensity of the received signal TX1*c* is greater than a first threshold value.

In operation S910, when the processor circuit 820 determines that the signal intensity of the received signal TX1*c* is greater than the first threshold value, it enters operation S920.

In operation S920, the processor circuit 820 determines whether the signal TX2*c* or the signal TX3*c* is received. When it is determined that the signal TX2*c* or the signal TX3*c* is received, the processor circuit 820 determines whether a signal intensity ratio of the signal TX2*c* to the signal TX1*c* or a signal intensity ratio of the signal TX3*c* to the signal TX1*c* is greater than a second threshold value to generate a determination result.

When the signal intensity ratio of the signal TX2*c* to the signal TX1*c* or the signal intensity ratio of the signal TX3*c* to the signal TX1*c* is greater than the second threshold value, it represents that the ring part electrode 714 and the ring part electrode 716 (the tip electrode 712) is closer to the touch panel 720, as shown on the left side of FIG. 7. Accordingly, the determination result of operation S920 is "Yes" and it enters operation S930.

In operation S930, the processor circuit 820 determines that the signal TX1*c* mainly comes from the tip electrode 712. The processor circuit 820 can operate according to the signal TX1*c* from the tip electrode 712. For example, the processor circuit 820 performs a write function according to the signal TX1*c* from the tip electrode 712.

When the signal intensity ratio of the signal TX2*c* to the signal TX1*c* or the signal intensity ratio of the signal TX3*c* to the signal TX1*c* is less than or equal to the second threshold value, it represents that the ring part electrode 714 and the ring part electrode 716 (the tip electrode 712) is farther away from the touch panel 720, as shown on the right side of FIG. 7. Accordingly, the determination result of operation S920 is "No" and it enters operation S940.

In operation S940, the processor circuit 820 determines that the signal TX1*c* mainly comes from the end electrode 718. The processor circuit 820 can operate according to the signal TX1*c* from the end electrode 718. For example, the processor circuit 820 performs an erase function according to the signal TX1*c* from the end electrode 718.

In another embodiment, the ring part electrode 714 and the ring part electrode 716 are disposed at two corresponding sides of the stylus 710. The processor circuit 820 can determine whether the stylus 710 rotates according to a signal intensity ratio of the signal TX2*c* to the signal TX1*c* and a signal intensity ratio of the signal TX3*c* to the signal TX1*c*. For example, the signal intensity ratio of the signal TX2*c* to the signal TX1*c* is a first ratio, and the signal intensity ratio of the signal TX3*c* to the signal TX1*c* is a second ratio. When the processor circuit 820 determines that both of the first ratio and the second ratio are greater than a second threshold value and the first ratio and the second ratio will change, the processor circuit 820 determines that the stylus 710 rotates. For example, when the processor circuit 820 determines that the first ratio is greater than the second ratio at a first timing point and the first ratio is less than the second ratio at a subsequent second timing point, the processor circuit 820 determines that the stylus 710 rotates.

In another embodiment, the processor circuit 820 can observe changes of the first ratio and the second ratio in a longer period of time to determine whether the stylus 710 rotates.

Figure 10:
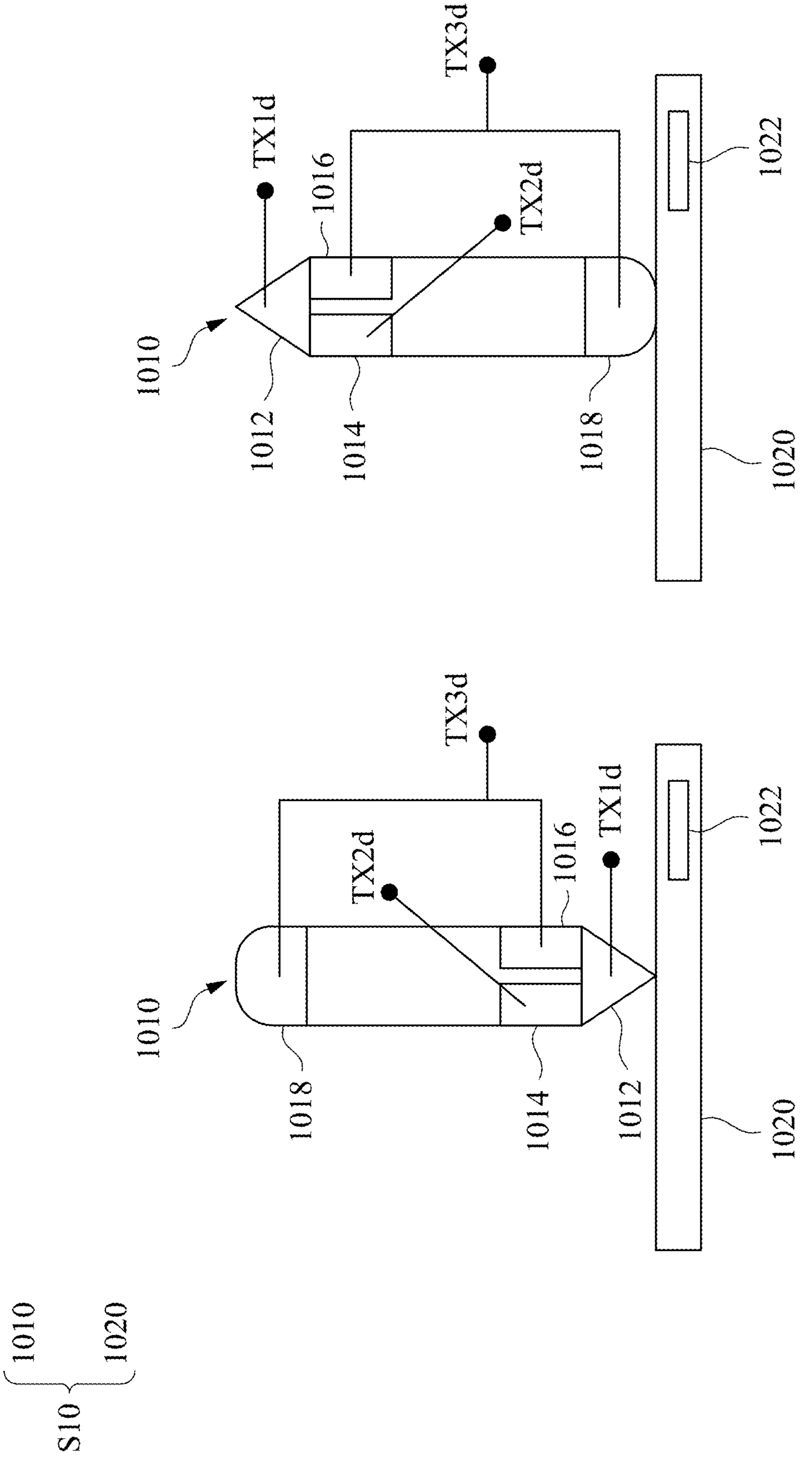
FIG. 10 is a schematic diagram illustrating a touch system according to some embodiments of the present disclosure.

Reference is made to FIG. 10. FIG. 10 is a schematic diagram illustrating a touch system S10 according to some embodiments of the present disclosure. The touch system S10 includes a stylus 1010 and a touch panel 1020. A user can operate the stylus 1010 to write, erase, or perform other functions on the touch panel 1020.

The stylus 1010 includes a tip electrode 1012, a ring part electrode 1014, a ring part electrode 1016, and an end electrode 1018. The tip electrode 1012 is disposed at a tip portion of a pen body of the stylus 1010. The ring part electrode 1014 and the ring part electrode 1016 are disposed at a ring portion of the pen body of the stylus 1010, and the ring portion is near fingers of the user when the user holds the stylus 1010. The end electrode 1018 is disposed at an end portion of the pen body of the stylus 1010.

The ring part electrode 1016 and the end electrode 1018 are to emit a signal TX3*d*. The tip electrode 1012 is to emit a signal TX1*d*. The ring part electrode 1014 is to emit a signal TX2*d*. The signal TX3*d*, the signal TX1*d*, and the signal TX2*d* are different from each other.

The touch panel 1020 includes a touch chip 1022. The touch chip 1022 is to receive (sense) the signal TX3*d*, the signal TX1*d*, and the signal TX2*d* from the stylus 1010.

Figure 11:
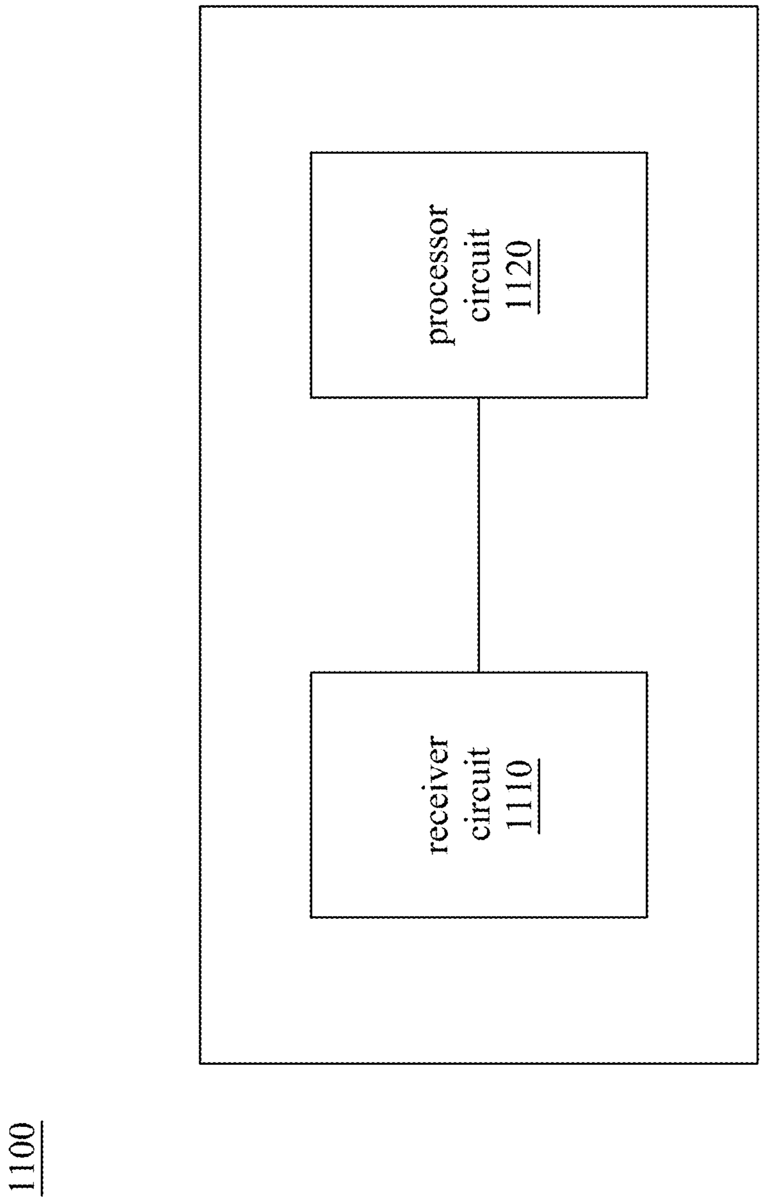
FIG. 11 is a schematic diagram illustrating a touch chip according to some embodiments of the present disclosure.

Reference is made to FIG. 11. FIG. 11 is a schematic diagram illustrating a touch chip 1100 according to some embodiments of the present disclosure. In some embodiments, the touch chip 1100 can be used to implement the touch chip 1022 in FIG. 10.

The touch chip 1100 includes a receiver circuit 1110 and a processor circuit 1120. The receiver circuit 1110 is coupled to the processor circuit 1120.

The receiver circuit 1110 is to receive (sense) the signal TX3*d*, the signal TX1*d*, and the signal TX2*d* from the stylus 1010.

Figure 12:
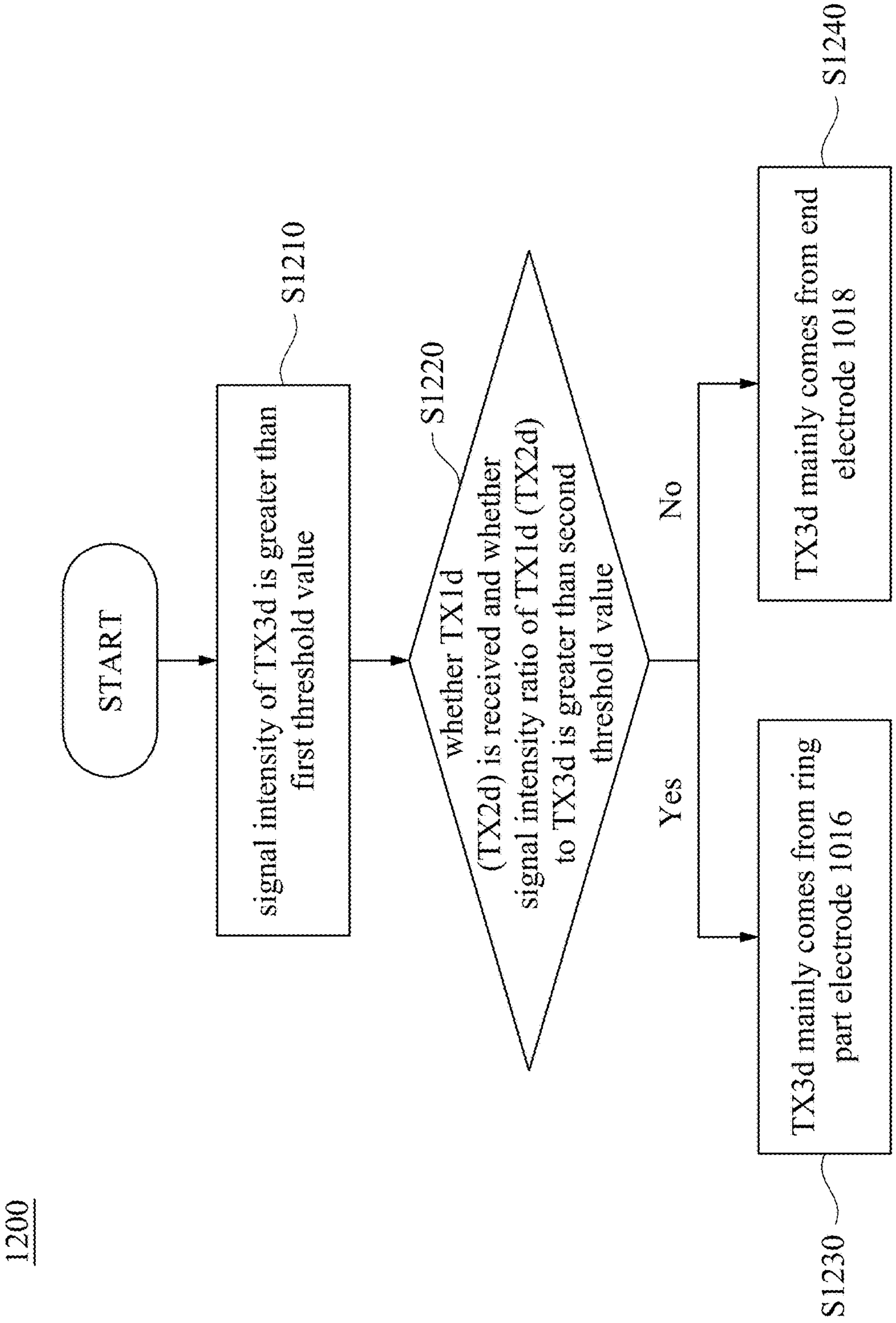
FIG. 12 is a flow diagram illustrating an erase method of a stylus according to some embodiments of the present disclosure.

Reference is made to FIG. 12. FIG. 12 is a flow diagram illustrating an erase method 1200 of the stylus 1010 according to some embodiments of the present disclosure.

The erase method 1200 includes operation S1210, operation S1220, operation S1230, and operation S1240. The processor circuit 1120 is to perform these operations.

At first, the processor circuit 1120 determines whether a signal intensity of the received signal TX3*d* is greater than a first threshold value.

In operation S1210, when the processor circuit 1120 determines that the signal intensity of the received signal TX3*d* is greater than the first threshold value, it enters operation S1220.

In operation S1220, the processor circuit 1120 determines whether the signal TX1*d* or the signal TX2*d* is received. When it is determined that the signal TX1*d* or the signal TX2*d* is received, the processor circuit 1120 determines whether a signal intensity ratio of the signal TX1*d* to the signal TX3*d* or a signal intensity ratio of the signal TX2*d* to the signal TX3*d* is greater than a second threshold value to generate a determination result.

When the signal intensity ratio of the signal TX1*d* to the signal TX3*d* or the signal intensity ratio of the signal TX2*d* to the signal TX3*d* is greater than the second threshold value, it represents that the tip electrode 1012 and the ring part electrode 1014 is closer to the touch panel 1020, as shown on the left side of FIG. 10. Accordingly, the determination result of operation S1220 is "Yes" and it enters operation S1230.

In operation S1230, the processor circuit 1120 determines that the signal TX3*d* mainly comes from the ring part electrode 1016. The processor circuit 1120 can operate according to the signal TX3*d* from the ring part electrode 1016. For example, the processor circuit 1120 determines a tilt angle of the stylus 1010 according to the signal TX3*d* from the ring part electrode 1016 and the signal TX1*d* from the tip electrode 1012.

When the signal intensity ratio of the signal TX1*d* to the signal TX3*d* or the signal intensity ratio of the signal TX2*d* to the signal TX3*d* is less than or equal to the second threshold value, it represents that the tip electrode 1012 and the ring part electrode 1014 is farther away from the touch panel 1020, as shown on the right side of FIG. 10. Accordingly, the determination result of operation S1220 is "No" and it enters operation S1240.

In operation S1240, the processor circuit 1120 determines that the signal TX3*d* mainly comes from the end electrode 1018. The processor circuit 1120 can operate according to the signal TX3*d* from the end electrode 1018. For example, the processor circuit 1120 performs an erase function according to the signal TX3*d* from the end electrode 1018.

In some other embodiments, the signal TX3*d* and the signal TX2*d* are interchangeable. In other words, in these other embodiments, the ring part electrode 1016 and the end electrode 1018 are changed to emit the signal TX2*d*. The ring part electrode 1014 is changed to emit the signal TX3*d*. The tip electrode 1012 is maintained to emit the signal TX1*d*.

Figure 13:
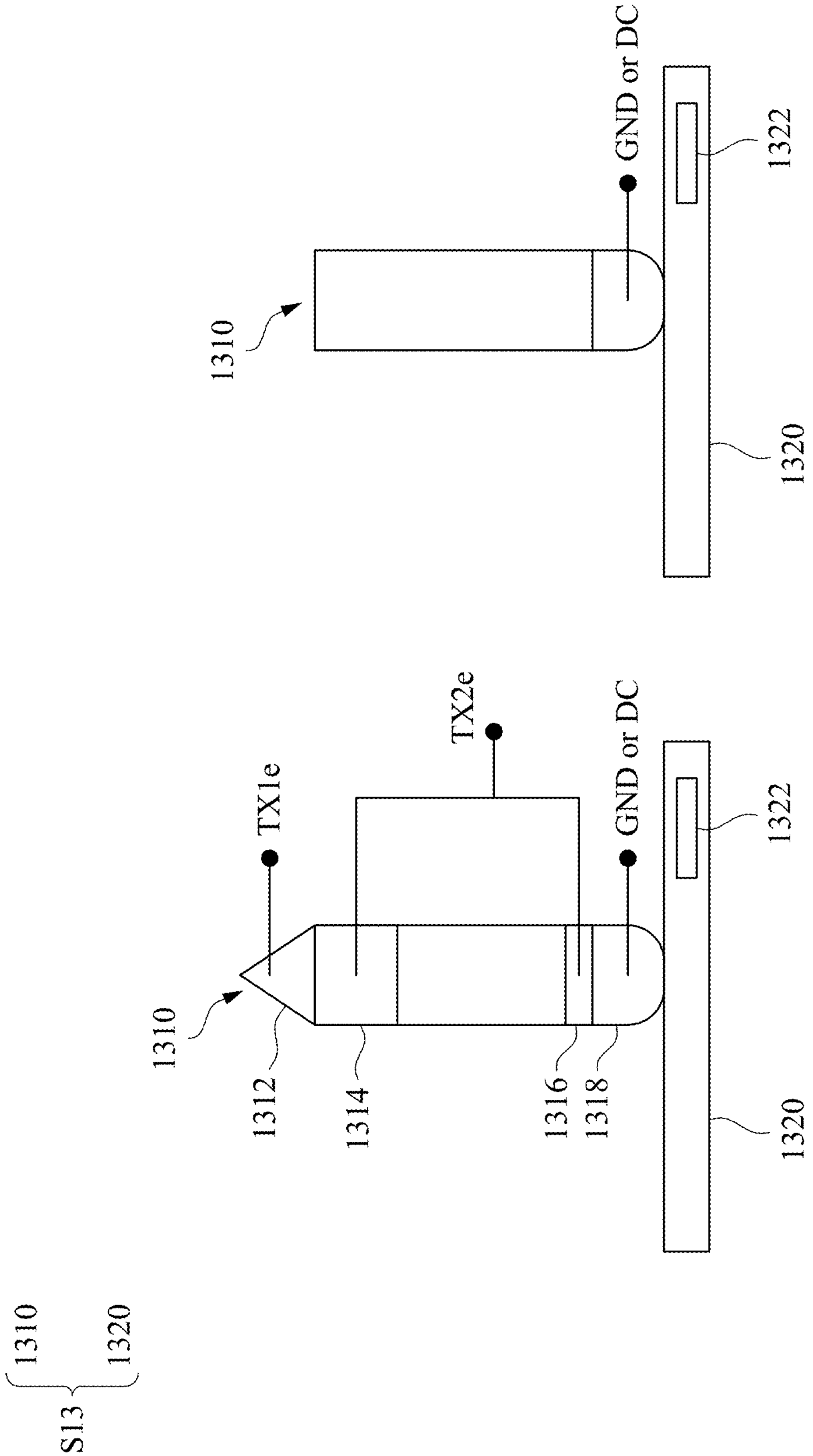
FIG. 13 is a schematic diagram illustrating a touch system according to some embodiments of the present disclosure.

Reference is made to FIG. 13. FIG. 13 is a schematic diagram illustrating a touch system S13 according to some embodiments of the present disclosure. The touch system S13 includes a stylus 1310 and a touch panel 1320. A user can operate the stylus 1310 to write, erase, or perform other functions on the touch panel 1320.

The stylus 1310 includes a tip electrode 1312, a ring electrode 1314, a ring electrode 1316, and an end electrode 1318. The tip electrode 1312 is disposed at a tip portion of a pen body of the stylus 1310. The ring electrode 1314 is disposed at a ring portion of the pen body of the stylus 1310, and the ring electrode 1314 is adjacent to the tip portion of the pen body. The ring portion is near fingers of the user when the user holds the stylus 1310. The end electrode 1318 is disposed at an end portion of the pen body of the stylus 1310. The ring electrode 1316 is disposed at the ring portion of the pen body of the stylus 1310, and the ring electrode 1316 is adjacent to the end portion of the pen body.

The end electrode 1318 is to emit a ground signal GND or a direct current signal DC. The ring electrode 1314 and the ring electrode 1316 are to emit a signal TX2*e*. The tip electrode 1312 is to emit a signal TX1*e*. The ground signal GND (or the direct current signal DC), the signal TX2*e*, and the signal TX1*e* are different from each other.

The touch panel 1320 includes a touch chip 1322. The touch chip 1322 is to receive (sense) the ground signal GND (or the direct current signal DC), the signal TX2*e*, and the signal TX1*e* from the stylus 1310.

Figure 14:
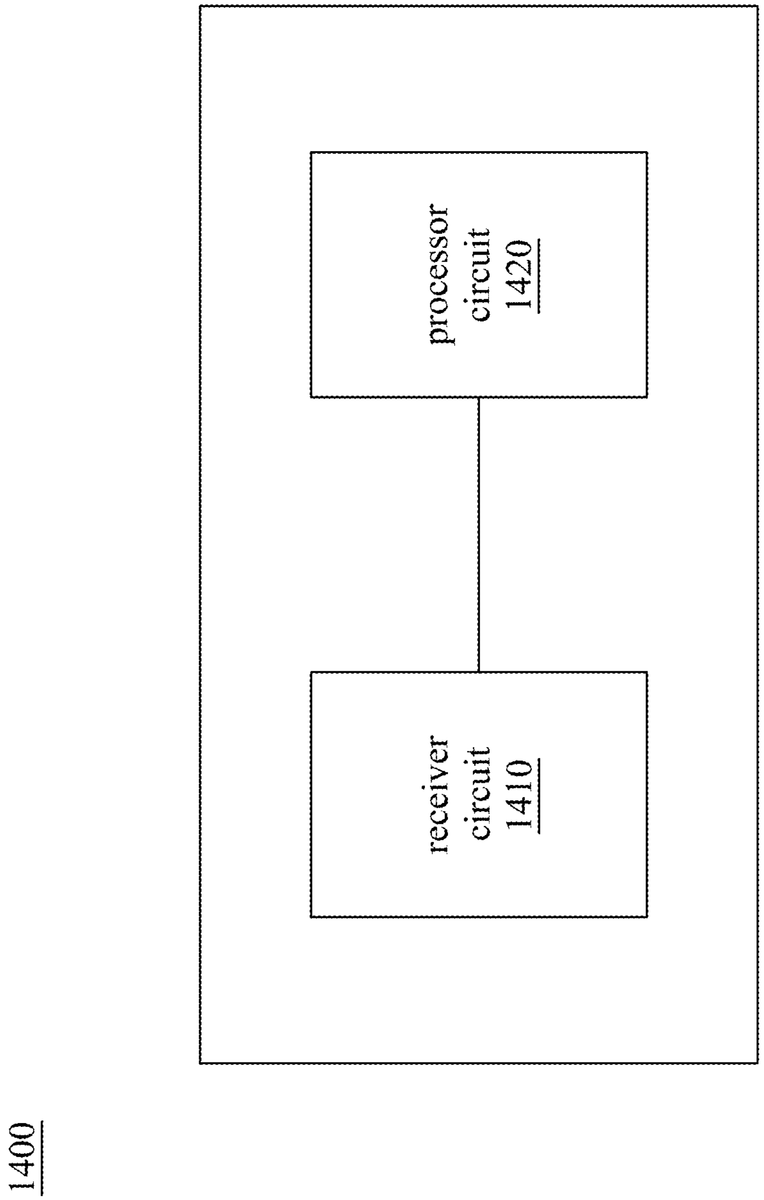
FIG. 14 is a schematic diagram illustrating a touch chip according to some embodiments of the present disclosure.

Reference is made to FIG. 14. FIG. 14 is a schematic diagram illustrating a touch chip 1400 according to some embodiments of the present disclosure. In some embodiments, the touch chip 1400 can be used to implement the touch chip 1322 in FIG. 13.

The touch chip 1400 includes a receiver circuit 1410 and a processor circuit 1420. The receiver circuit 1410 is coupled to the processor circuit 1420.

The receiver circuit 1410 is to receive (sense) the ground signal GND (or the direct current signal DC), the signal TX2*e*, and the signal TX1*e* from the stylus 1310.

Figure 15:
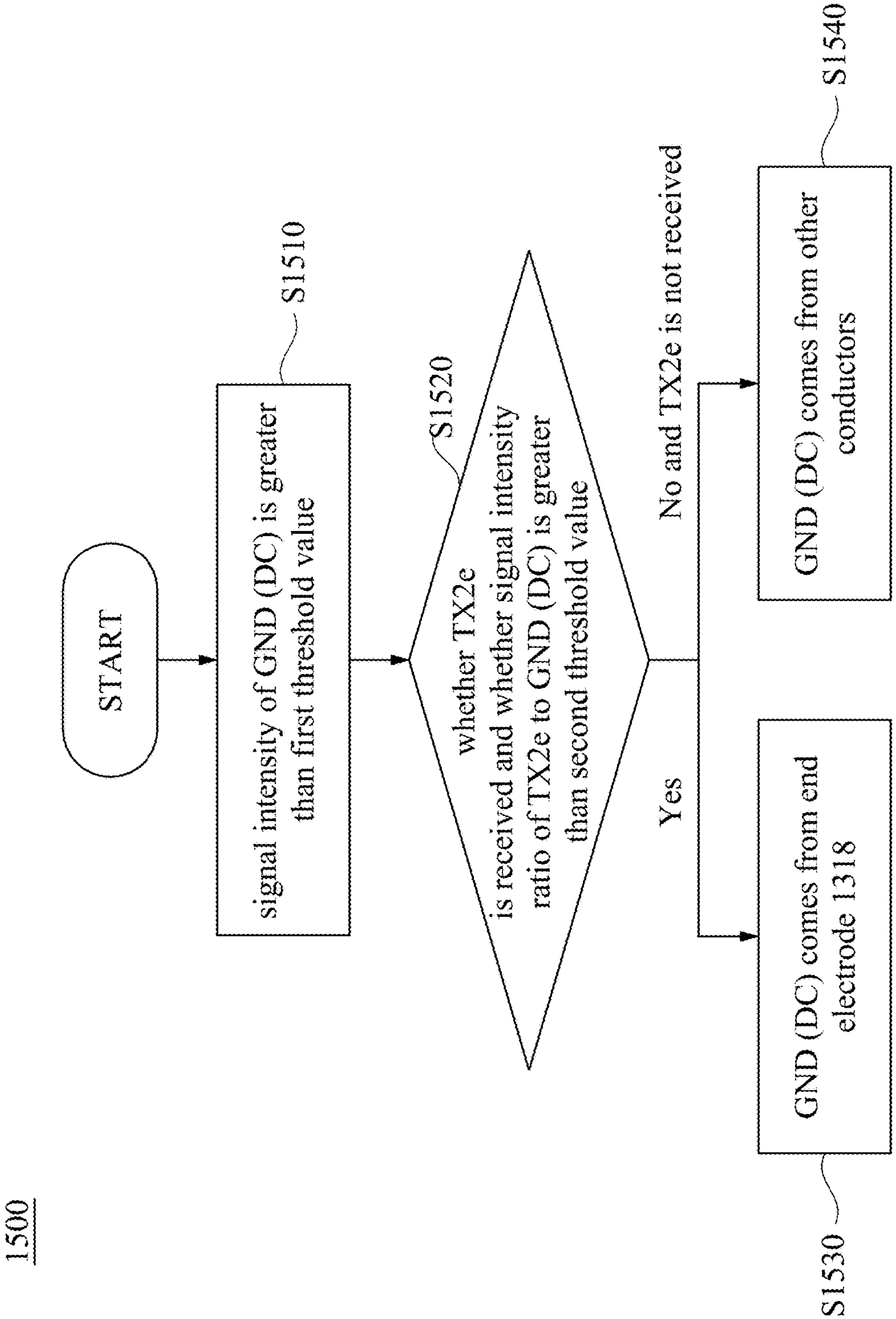
FIG. 15 is a flow diagram illustrating an erase method of a stylus according to some embodiments of the present disclosure.

Reference is made to FIG. 15. FIG. 15 is a flow diagram illustrating an erase method 1500 of the stylus 1310 according to some embodiments of the present disclosure.

The erase method 1500 includes operation S1510, operation S1520, operation S1530, and operation S1540. The processor circuit 1420 is to perform these operations.

At first, the processor circuit 1420 determines whether a signal intensity of the ground signal GND (or the direct current signal DC) is greater than a first threshold value.

In operation S1510, when the processor circuit 1420 determines that the signal intensity of the ground signal GND (or the direct current signal DC) is greater than the first threshold value, it enters operation S1520.

In operation S1520, the processor circuit 1420 determines whether the signal TX2*e* is received. When it is determined that the signal TX2*e* is received, the processor circuit 1420 determines whether a signal intensity ratio of the ground signal GND (or the direct current signal DC) to the signal TX2*e* is greater than a second threshold value to generate a determination result.

When the signal intensity ratio of the ground signal GND (or the direct current signal DC) to the signal TX2*e* is greater than the second threshold value, it represents that the end electrode 1318 is near or in contact with the touch panel 1320, as shown on the left side of FIG. 13. Accordingly, the determination result of operation S1520 is "Yes" and it enters operation S1530.

In operation S1530, the processor circuit 1420 determines that the ground signal GND (or the direct current signal DC) comes from the end electrode 1318. The processor circuit 1420 can operate according to the ground signal GND (or the direct current signal DC) from the end electrode 1318. For example, the processor circuit 1420 performs an erase function according to the ground signal GND (or the direct current signal DC) from the end electrode 1318.

When the determination result of operation S1520 is "No" and the processor circuit 1420 determines that the signal TX2*e* is not received, it enters operation S1540.

In operation S1540, the processor circuit 1420 determines that the ground signal GND (or the direct current signal DC) comes from other conductors. Other conductors include, for example, a finger.

Based on the descriptions above, in the present disclosure, the touch chip can determine the state of the stylus to perform the erase function correspondingly, has the advantage of low cost, and is less likely to cause misjudgment.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch chip to receive a first signal and a second signal from a stylus, wherein the touch chip comprises:
- a receiver circuit to receive the first signal and the second signal; and
- a processor circuit coupled to the receiver circuit and to perform operations below:
  - determining whether a signal intensity of the received first signal is greater than a first threshold value;
  - determining whether the second signal is received when the signal intensity of the received first signal is greater than the first threshold value;
  - determining whether a signal intensity ratio of the second signal to the first signal is greater than a second threshold value to generate a determination result when it is determined that the second signal is received;
  - performing a write function according to a first result of the determination result; and
  - performing an erase function according to a second result of the determination result.

2. The touch chip of claim 1, wherein the stylus comprises a tip electrode, a ring electrode, and an end electrode, wherein the tip electrode and the end electrode are to emit the first signal, and the ring electrode is to emit the second signal,
- wherein when the second result is that the signal intensity ratio is less than or equal to the second threshold value, the processor circuit performs the erase function.

3. The touch chip of claim 1, wherein the stylus comprises a tip electrode, a ring electrode, and an end electrode, wherein the ring electrode and the end electrode are to emit the first signal, and the tip electrode is to emit the second signal,
- wherein when the second result is that the signal intensity ratio is less than or equal to the second threshold value, the processor circuit performs the erase function.

4. The touch chip of claim 1, wherein the stylus comprises a tip electrode, a first ring part electrode, a second ring part electrode, and an end electrode, wherein the tip electrode and the end electrode are to emit the first signal, the first ring part electrode is to emit the second signal, and the second ring part electrode is to emit a third signal,
- wherein when the second result is that the signal intensity ratio is less than or equal to the second threshold value, the processor circuit performs the erase function.

5. The touch chip of claim 1, wherein the stylus comprises a tip electrode, a first ring part electrode, a second ring part electrode, and an end electrode, wherein the first ring part electrode and the end electrode are to emit the first signal, and the tip electrode or the second ring part electrode are to emit the second signal,
- wherein when the second result is that the signal intensity ratio is less than or equal to the second threshold value, the processor circuit performs the erase function.

6. The touch chip of claim 1, wherein the stylus comprises a tip electrode, a first ring electrode, a second ring electrode, and an end electrode, wherein the first signal is a ground signal or a direct current signal and the end electrode is to emit the first signal, and the first ring electrode and the second ring electrode are to emit the second signal,
- wherein when the second result is that the signal intensity ratio is greater than the second threshold value, the processor circuit performs the erase function.

7. A touch system, comprising:
- a stylus; and
- a touch panel, comprising:
  - a touch chip to receive a first signal and a second signal from the stylus and comprising a receiver circuit and a processor circuit, wherein the receiver circuit is to receive the first signal and the second signal, and the processor circuit is coupled to the receiver circuit and to perform operations below:
    - determining whether a signal intensity of the received first signal is greater than a first threshold value;
    - determining whether the second signal is received when the signal intensity of the received first signal is greater than the first threshold value;
    - determining whether a signal intensity ratio of the second signal to the first signal is greater than a second threshold value to generate a determination result when it is determined that the second signal is received;
    - performing a write function according to a first result of the determination result; and
    - performing an erase function according to a second result of the determination result.

8. The touch system of claim 7, wherein the stylus comprises a tip electrode, a ring electrode, and an end electrode, wherein the tip electrode and the end electrode are to emit the first signal, and the ring electrode is to emit the second signal,
- wherein when the second result is that the signal intensity ratio is ess than or equal to the second threshold value, the processor circuit performs the erase function.

9. The touch system of claim 7, wherein the stylus comprises a tip electrode, a ring electrode, and an end electrode, wherein the ring electrode and the end electrode are to emit the first signal, and the tip electrode is to emit the second signal, wherein when the second result is that the signal intensity ratio is less than or equal to the second threshold value, the processor circuit performs the erase function.

10. The touch system of claim 7, wherein the stylus comprises a tip electrode, a first ring part electrode, a second ring part electrode, and an end electrode, wherein the tip electrode and the end electrode are to emit the first signal, the first ring part electrode is to emit the second signal, and the second ring part electrode is to emit a third signal, wherein when the second result is that the signal intensity ratio is less than or equal to the second threshold value, the processor circuit performs the erase function.

11. The touch system of claim 7, wherein the stylus comprises a tip electrode, a first ring part electrode, a second ring part electrode, and an end electrode, wherein the first ring part electrode and the end electrode are to emit the first signal, and the tip electrode or the second ring part electrode are to emit the second signal, wherein when the second result is that the signal intensity ratio is less than or equal to the second threshold value, the processor circuit performs the erase function.

12. The touch system of claim 7, wherein the stylus comprises a tip electrode, a first ring electrode, a second ring electrode, and an end electrode, wherein the first signal is a ground signal or a direct current signal and the end electrode is to emit the first signal, and the first ring electrode and the second ring electrode are to emit the second signal, wherein when the second result is that the signal intensity ratio is greater than the second threshold value, the processor circuit performs the erase function.

13. An erase method of a stylus, comprising:

receiving, by a receiver circuit in a touch chip, a first signal and a second signal from the stylus;

determining, by a processor circuit, whether a signal intensity of the received first signal is greater than a first threshold value;

determining, by the processor circuit, whether the second signal is received when the signal intensity of the received first signal is greater than the first threshold value;

determining, by the processor circuit, whether a signal intensity ratio of the second signal to the first signal is greater than a second threshold value to generate a determination result when it is determined that the second signal is received;

performing, by the processor circuit, a write function according to a first result of the determination result; and performing, by the processor circuit, an erase function according to a second result of the determination result.

14. The erase method of the stylus of claim 13, wherein the stylus comprises a tip electrode, a ring electrode, and an end electrode, wherein the tip electrode and the end electrode are to emit the first signal, and the ring electrode is to emit the second signal, wherein when the second result is that the signal intensity ratio is less than or equal to the second threshold value, the processor circuit performs the erase function.

15. The erase method of the stylus of claim 13, wherein the stylus comprises a tip electrode, a ring electrode, and an end electrode, wherein the ring electrode and the end electrode are to emit the first signal, and the tip electrode is to emit the second signal, wherein when the second result is that the signal intensity ratio is less than or equal to the second threshold value, the processor circuit performs the erase function.

16. The erase method of the stylus of claim 13, wherein the stylus comprises a tip electrode, a first ring part electrode, a second ring part electrode, and an end electrode, wherein the tip electrode and the end electrode are to emit the first signal, the first ring part electrode is to emit the second signal, and the second ring part electrode is to emit a third signal, wherein when the second result is that the signal intensity ratio is less than or equal to the second threshold value, the processor circuit performs the erase function.

17. The erase method of the stylus of claim 13, wherein the stylus comprises a tip electrode, a first ring part electrode, a second ring part electrode, and an end electrode, wherein the first ring part electrode and the end electrode are to emit the first signal, and the tip electrode or the second ring part electrode are to emit the second signal, wherein when the second result is that the signal intensity ratio is less than or equal to the second threshold value, the processor circuit performs the erase function.

18. The erase method of the stylus of claim 13, wherein the stylus comprises a tip electrode, a first ring electrode, a second ring electrode, and an end electrode, wherein the first signal is a ground signal or a direct current signal and the end electrode is to emit the first signal, and the first ring electrode and the second ring electrode are to emit the second signal, wherein when the second result is that the signal intensity ratio is greater than the second threshold value, the processor circuit performs the erase function.

* * * * *